(12) United States Patent
Kang et al.

(10) Patent No.: US 8,804,610 B2
(45) Date of Patent: Aug. 12, 2014

(54) PACKET TRANSMISSION SCHEDULING METHOD FOR SIMULTANEOUS PACKET TRANSMISSION IN MULTIPLEXING PATHS IN WIRELESS NETWORK, AND PACKET TRANSMISSION METHOD USING THE SAME

(75) Inventors: Hyunduk Kang, Daejon (KR); Heon-Jin Hong, Daejon (KR); Hyuk Lim, Gwangju (KR); Daewon Jung, Gwangju (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1340 days.

(21) Appl. No.: 12/136,669

(22) Filed: Jun. 10, 2008

(65) Prior Publication Data
US 2009/0147790 A1    Jun. 11, 2009

(30) Foreign Application Priority Data
Dec. 10, 2007  (KR) .................. 10-2007-0127862

(51) Int. Cl.
*H04W 4/00* (2009.01)
*H04B 7/00* (2006.01)
*H04K 3/00* (2006.01)
*H04B 1/00* (2006.01)
*H04B 1/04* (2006.01)
*H04B 1/06* (2006.01)
*H04B 1/10* (2006.01)

(52) U.S. Cl.
USPC ............ 370/328; 370/310.2; 370/338; 455/1; 455/63.1; 455/114.2; 455/278.1; 455/296

(58) Field of Classification Search
USPC .................. 370/328, 310.2, 338; 455/1, 63.1, 455/114.2, 278.1, 296
See application file for complete search history.

(56) References Cited

U.S. PATENT DOCUMENTS

| | | | | |
|---|---|---|---|---|
| 5,875,180 | A * | 2/1999 | Wiedeman et al. | 370/320 |
| 6,751,199 | B1 * | 6/2004 | Sindhushayana et al. | 370/252 |
| 2002/0012327 | A1 * | 1/2002 | Okada | 370/328 |
| 2002/0067736 | A1 * | 6/2002 | Garcia-Luna-Aceves et al. | 370/442 |
| 2003/0058826 | A1 * | 3/2003 | Shearer, III | 370/338 |
| 2003/0179742 | A1 * | 9/2003 | Ogier et al. | 370/351 |

(Continued)

FOREIGN PATENT DOCUMENTS

| | | |
|---|---|---|
| JP | 2007-267281 A | 10/2007 |
| KR | 10-2005-0014705 A | 2/2005 |

(Continued)

OTHER PUBLICATIONS

"Throughput Enhancement in WiMAx Mesh Networks Using Concurrent Transmission" Jian Tao et al., Wireless Communications, Networking and Mobile Computing, vol. 2, pp. 871-874, Sep. 2005.

*Primary Examiner* — Brandon Renner
*Assistant Examiner* — Abdelnabi Musa
(74) *Attorney, Agent, or Firm* — Rabin & Berdo, P.C.

(57) ABSTRACT

Provided are a packet transmission scheduling method in a wireless network and a packet transmission method using the same. The packet transmission scheduling method, includes storing location information and a path loss exponent of each node on a multiplexing path; calculating a Signal-to-Interference and Noise Ratio (SINR) between nodes on a predetermined path based on the stored location information; when the calculated SINR exceeds a threshold, forming the paths as a path table; and scheduling packet transmission based on the formed path table.

11 Claims, 3 Drawing Sheets

(56) References Cited

U.S. PATENT DOCUMENTS

| | | |
|---|---|---|
| 2005/0130664 A1 | 6/2005 | Sang et al. |
| 2007/0115870 A1* | 5/2007 | Xu et al. ................. 370/318 |
| 2007/0242621 A1* | 10/2007 | Nandagopalan et al. ..... 370/254 |
| 2009/0003294 A1* | 1/2009 | Zhu et al. ................. 370/338 |
| 2009/0010176 A1* | 1/2009 | Huang et al. ............... 370/252 |
| 2009/0010234 A1* | 1/2009 | Li et al. ................... 370/338 |

FOREIGN PATENT DOCUMENTS

| | | |
|---|---|---|
| KR | 10-2005-0116852 A | 12/2005 |
| WO | WO-2005/074212 A1 | 8/2005 |
| WO | WO-2006/075942 A1 | 7/2006 |

\* cited by examiner

PACKET TRANSMISSION SCHEDULING METHOD FOR SIMULTANEOUS PACKET TRANSMISSION IN MULTIPLEXING PATHS IN WIRELESS NETWORK, AND PACKET TRANSMISSION METHOD USING THE SAME

CROSS-REFERENCE(S) TO RELATED APPLICATIONS

The present invention claims priority of Korean Patent Application No. 10-2007-0127862, filed on Dec. 10, 2007, which is incorporated herein by reference.

BACKGROUND OF THE INVENTION

1. Field of the Invention

The present invention relates to a packet transmission scheduling method in a wireless network and a packet transmission method using the same; and, more particularly, to a packet transmission scheduling method for maximizing a total quantity of transmission of an entire network by estimating interference between nodes based on geographical location information of the nodes in a wireless network and raising spatial reusability through transmission scheduling in consideration of interference between nodes in a gateway node, and a packet transmission method using the same.

This work was supported by the IT R&D program for MIC/IITA [2005-S-046-03, "Development of the basic spectrum resource utilizing technology"].

2. Description of Related Art

In a wireless mesh network of a new concept, a fixed wired network is not used and a plurality of wireless nodes are connected without mobility according to an Ad-hoc method, thereby realizing a wireless data communication.

In the wireless mesh network, the wireless nodes are connected to each other in a net format, and all nodes are connected to Internet through a few gateway nodes capable of accessing to dual-Internet.

Therefore, the wireless mesh network may be a proper alternative when it is difficult to build a wired network, or when a temporary Internet access service should be provided for a short time.

Also, since the wireless mesh network does not have a limitation in extending the number of wireless nodes and does not require building of the wired network or a base station, fast network formation is possible and it does not require a high cost for building the network.

The wireless mesh network can easily extend the network without connecting the wired network, thereby improving speed and economic efficiency in building of the network, and flexibility and extendibility of the network.

Since an object of the wireless mesh network is to provide a backbone service that wireless nodes replace the wired network, a total quantity of traffic for transmission becomes the most important performance indicator.

SUMMARY OF THE INVENTION

Therefore, a method for increasing a total transmission quantity of a wireless mesh network is required and an object of the present invention is to provide the requirements.

An embodiment of the present invention is directed to providing a packet transmission scheduling method for maximizing a total quantity of transmission of an entire network by estimating interference between nodes based on geographical location information of the nodes in a wireless network and raising spatial reusability through transmission scheduling in consideration of interference between nodes in a gateway node, and a packet transmission method using the same.

Another embodiment of the present invention is directed to providing a packet transmission method in a wireless network for maximizing a total quantity of transmission of an entire network by storing packets to be transmitted in turn through each path included in a path set based on a scheduling result according to the above method and sequentially transmitting the stored packets through the path.

The objects of the present invention are not limited to the above-mentioned ones. Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a packet transmission scheduling method in a wireless network, including: storing location information and a path loss exponent of each node on a multiplexing path; calculating a Signal-to-Interference and Noise Ratio (SINR) between nodes on a predetermined path based on the stored location information; when the calculated SINR exceeds a threshold, forming the paths as a path table; and scheduling packet transmission based on the formed path table.

In accordance with another aspect of the present invention, there is provided a packet transmission method in a wireless network, including: scheduling packet transmission based on a path table; setting up a back off time and counting a back off time when a channel is in an idle state for a predetermined time; and when the counting is completed, transmitting a packet based on a scheduling result.

The present invention acquires location information of a mesh network node through Global Positioning System GPS information and estimates interference between a gateway node and a node in a 2-hop distance from the gateway node through the acquired location information. When it is determined through the estimated interference that the interference between the nodes does not affect packet transmission, the gateway node maximizes spatial reusability by rescheduling the packet transmission.

Also, the present invention suggests a method for estimating interference between the gateway node and the node in a 2-hop distance from the gateway node through geographical information, a method for scheduling packet transmission in the gateway node by applying the estimated interference, and a method for simultaneously transmitting packets based on the scheduling.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

In an embodiment of the present invention, a wireless mesh network will be described as an example of a wireless network.

Figure 1:
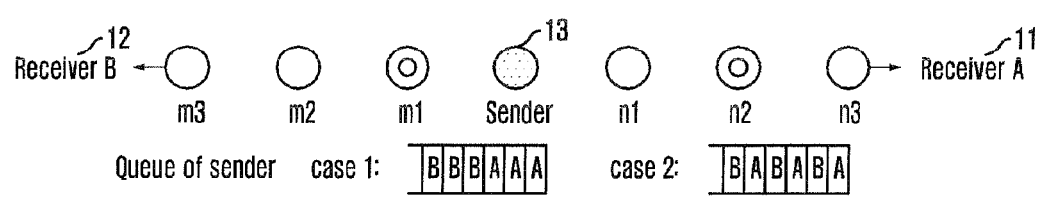
FIG. 1 is a packet transmission scheduling method in a wireless mesh network in accordance with an embodiment of the present invention.

FIG. 1 is a packet transmission scheduling method in a wireless mesh network in accordance with an embodiment of the present invention and shows a packet transmission scheduling method of a gateway node in a wireless mesh network that there is no mobility of nodes.

Referring to FIG. 1, in a wireless mesh network of a simple structure formed of two multiplexing paths, following two cases are expected according to a scheduling method of a gateway node 13 to transmit a packet. Although the wireless mesh network formed of two multiplexing paths is described as an example for the sake of convenience in explanation, it is noted that the number of multiplexing paths does not limit the present invention.

In a case 1, first 3 packets among a total of 6 packets stored in a queue are set up as a destination node A 11 and last 3 packets are set up as a destination node B 12.

Therefore, the gateway node 13, which is a sender, transmits all of 3 packets to be transmitted to the destination node A 11 and sequentially transmits rest 3 packets to the destination node B 12.

Generally, in a multiplexing wireless path, a transmission quantity of unidirectional packet transmission is limited by recurrent interference. The recurrent interference means a phenomenon that when a packet currently transmitted from a node competes with a pre-transmitted packet, a transmission quantity does not come up to a bandwidth of a wireless link. Therefore, in the case 1, the packet transmission to each destination node cannot be maximally performed due to the recurrent interference.

In a case 2, a front packet among 6 packets stored in the queue is set up as the destination node A 11 and a next packet is set up as the destination node B 12. In the same manner, the destinations of the rest packets are set up in turn.

Therefore, the gateway node 13 transmits a packet to the destination node A 11 and then transmits another packet to the destination node B 12. That is, the gateway node 13 transmits a packet to the destination node A 11 and the destination node B 12 according to an interleaving method.

At the same time, simultaneous transmission is possible within a range where interference between mutual transmission nodes is not generated. To be specific, when a packet toward the destination node A 11 is transmitted to a node n2 and a packet toward the destination node B 12 is transmitted to a node m1, two packets can be simultaneously transmitted within a range that mutual interference does not affect.

When the range of the interference between nodes corresponds to 2 to 3 times of the packet transmission range, the packet can be simultaneously transmitted in an m1 node and an n2 node, or an m2 node and an n1 node.

Accordingly, in the case 2, packet transmission can increase the total transmission quantity of the network without limitation in the transmission quantity due to the recurrent interference by applying diversity of a time and space.

Finally, space reusability of the channel can be maximized by setting a set of paths for simultaneously transmitting packets by estimating interference between the gate node and a node in a 2-hop distance from the gateway node 13 and by simultaneously transmitting the packet going through the path.

Figure 2:
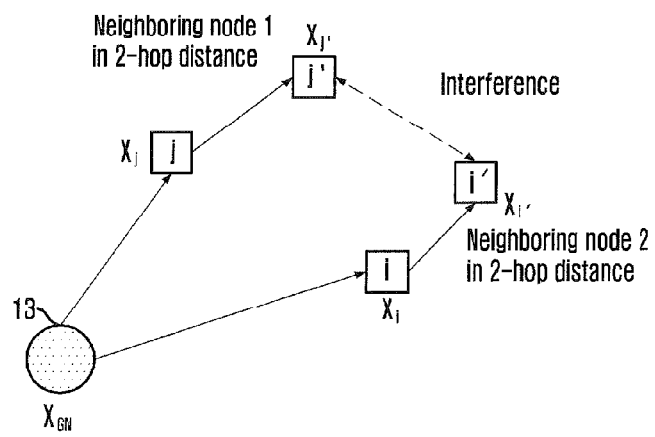
FIG. 2 describes a procedure of estimating interference affecting each node on a wireless mesh network in accordance with an embodiment of the present invention.

FIG. 2 describes a procedure of estimating interference affecting each node on a wireless mesh network in accordance with an embodiment of the present invention and shows a procedure of estimating interference through geographical location information of the node in a 2-hop distance from the gateway node 13.

When a distance between a sender and a receiver is 'd' a size of a reception signal in a location of the receiver has a relation as shown in Equation 1 with respect to the distance d.

$$P_r = K \frac{P_t}{d^\alpha} \qquad \text{Eq. 1}$$

where $P_r$ represents a size of a reception signal and $P_t$ represents a size of a transmission signal. Also, $\overline{\alpha}$| represents a path loss exponent and K, which is an antenna gain value, represents a constant for showing that $P_r$ is in proportion to $P_t/d^\alpha$.

Since a distance between the gateway node 13 and a neighboring node in a 1-hop distance from the gateway node 13 is too close, mutual interference is not avoidable.

Interference between the gateway node 13 and the neighboring node in a 1-hop distance from the gateway node 13 is estimated based on location information.

The gateway node 13 has two paths as shown in FIG. 2. A location of a node i' in a 2-hop distance from the gateway node 13 is Xi' and a location of j' in a 2-hop distance is Xj'.

Since the node i' receives a packet from the i node, the size of the reception signal is provided from the distance of the i node and the i' node as shown in Equation 2.

$$P_r = K \frac{P_t}{|X_i - X_{i'}|^\alpha} \qquad \text{Eq. 2}$$

Also, there are j and j' nodes as a node interfering in the packet reception in the i' node and a maximum quantity of interference from the j and j' nodes is as shown in Equation 3.

$$I = K \frac{P_t}{\min(|X_j - X_{i'}|^\alpha, |X_{j'} - X_{i'}|^\alpha)} \qquad \text{Eq. 3}$$

Finally, a Signal-to-Interference and Noise Ratio (SINR) in i' is as shown in Equation 4.

$$SINR = \frac{\min(|X_j - X_{i'}|^\alpha, |X_{j'} - X_{i'}|^\alpha)}{|X_i - X_{i'}|^\alpha} \qquad \text{Eq. 4}$$

That is, the SINR is determined by a distance between nodes and a path loss exponent. When the SINR is larger than a threshold ⊖| for successful packet reception, the gateway node 13 determines that simultaneous transmission of packets is possible through two paths without interference, thereby scheduling the packet transmission. β| is determined through a test according to a structure of the wireless mesh network and 10 dB is generally used.

Accordingly, the gateway node 13 forms a path table of all paths which can perform simultaneous transmission and improves spatial applicability of the channel by scheduling a transmission order with reference to the path table in packet transmission.

Figure 3:
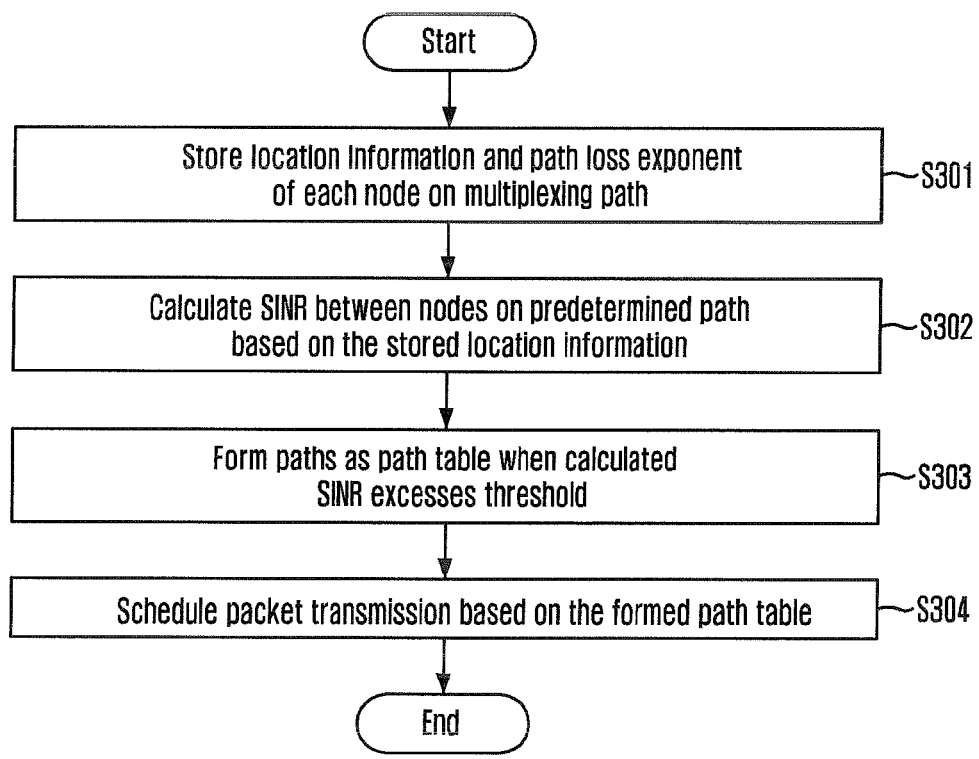
FIG. 3 is a flowchart describing a packet transmission scheduling method in the wireless mesh network in accordance with an embodiment of the present invention.

FIG. 3 is a flowchart describing a packet transmission scheduling method in the wireless mesh network in accordance with an embodiment of the present invention.

The gateway node stores location information and a path loss exponent of each node on a multiplexing path at step S301.

The gateway node calculates SINR between nodes located in a predetermined distance from the gateway node on a predetermined path based on the stored location information at step S302. The predetermined distance may be a 2-hop distance.

When the calculated SINR excesses a threshold, the paths are formed of the path table at step S303.

The packet transmission is scheduled based on the formed path table at step S304.

Figure 4:
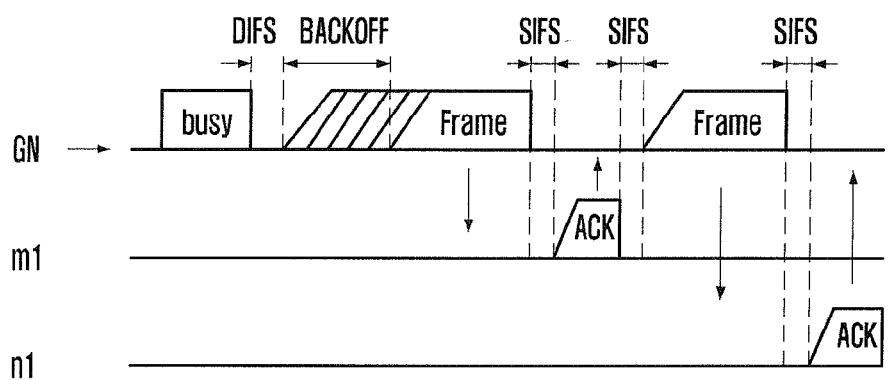
FIG. 4 describes a packet transmission method in the wireless mesh network in accordance with an embodiment of the present invention.

FIG. 4 describes a packet transmission method in the wireless mesh network in accordance with an embodiment of the present invention and shows the packet transmission method when it is determined that there is no interference due to an enough distance between the gate node and neighboring nodes m2 and n2 in a 2-hop distance from the gateway node.

First, the gateway node sets up a back off time and sequentially reduces a hack off counter when it is checked that a Distributed Coordination Function Inter Frame Space (DCF IFS) channel is in an idle state for a predetermined time.

When the back off counter reaches 0, the gateway node transmits the packet to the m1 node on the path of the destination node m2. When the packet is successfully transmitted to the m1 node, the gateway node starts packet transmission directly to the n1 node on the path of the destination node n2 without the back off procedure.

When there are 3 nodes in a 2-hop distance from the gateway node, and interference of 3 nodes is too small to be considered, the gateway node transmits consecutively 3 packets through only the first back off procedure.

When the packet is transmitted in the above manner, each packet goes to the destination through the path, thereby reducing interference among the nodes. The interference between the nodes having a gap over 2 hops is too small to be considered.

When the gateway node consecutively transmits the packets without the back off procedure, an unfair situation such as a case that the gateway node exclusively uses the channel for a long time through only one back off procedure in the wireless mesh network sharing wireless media.

Therefore, after consecutively transmitting the packets through one back off procedure, the gateway node selects a back off value under a condition of Equation 5 in selection of the back off value of a next contention window.

$$CW = \min(|\Lambda| \times CW_{min}, CW_{max}) \qquad \text{Eq. 5}$$

where |Λ| represents the number of packets consecutively transmitted in the former transmission, $CW_{min}$ represents a minimal contention window size, and $CW_{max}$ represents a maximal contention window size.

This is a method for performing back off in the next back off procedure for a long time, to which a time corresponding to the time that the gateway node transmits the packet without the back off procedure is added. The method can solve the problem that the gateway node exclusively uses the channel in the wireless mesh network.

Figure 5:
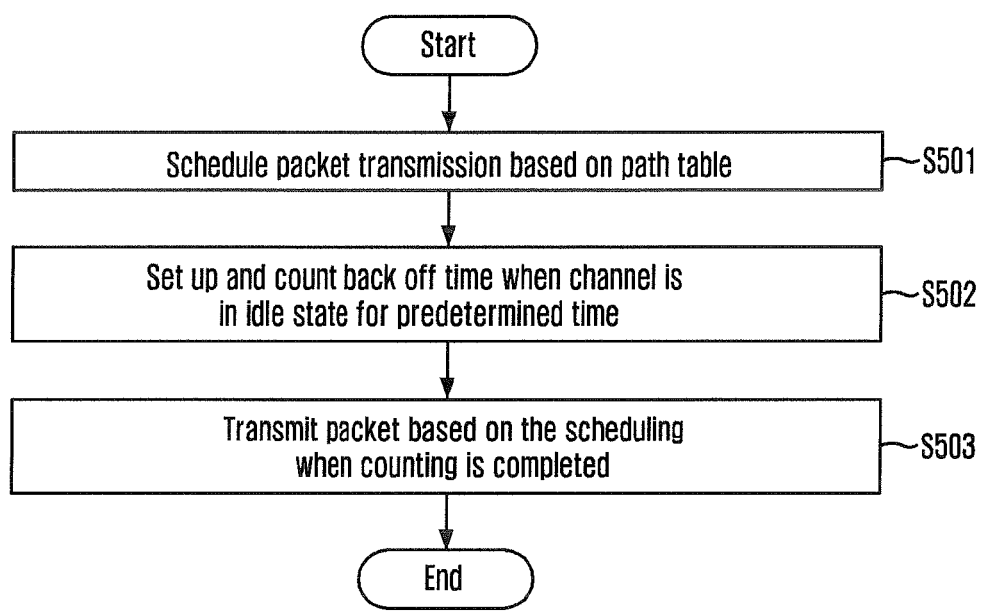
FIG. 5 is a flowchart describing a packet transmission method in the wireless mesh network in accordance with an embodiment of the present invention.

FIG. 5 is a flowchart describing a packet transmission method in the wireless mesh network in accordance with an embodiment of the present invention.

The packet transmission is scheduled based on the path table at step S501.

A back off time is set up and counted when the channel is in an idle state for a predetermined time at step S502.

When the counting is completed, the packet is transmitted based on the scheduling at step S503.

That is, the packets transmitted to each path included in the path set are stored in the queue in turn. Subsequently, the packets stored in the queue in turn are sequentially transmitted through the path.

The present invention provides a packet transmission scheduling method for maximizing a total quantity of transmission of an entire network by estimating interference between nodes based on geographical location information of the nodes in a wireless network and raising spatial reusability through transmission scheduling in consideration of interference between nodes in a gateway node.

The present invention can be applied to a wireless mesh network.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording media which can be read by the computer.

While the present invention has been described with respect to the specific embodiments, it will be apparent to those skilled in the art that various changes and modifications may be made without departing from the spirit and scope of the invention as defined in the following claims.

What is claimed is:

1. A packet transmission scheduling method in a wireless network for simultaneously transmitting packets from a gateway node to a plurality of receiver nodes, comprising:

storing location information of the gateway node and the plurality of receiver nodes, and a path loss exponent of each multiplexing path in which one of the plurality of receiver nodes is located;

selecting from the plurality of receiver nodes two receiver nodes that are at a predetermined distance from the gateway node, calculating a Signal-to-Interference and Noise Ratio (SINR) for one of the selected receiver nodes using a distance between the two selected receiver nodes and a corresponding path loss exponent, and when the calculated SINR exceeds a threshold, forming a path table that includes a path between the two selected receiver nodes to simultaneously transmit the packets from the gateway node to the two selected receiver nodes; and scheduling packet transmission based on the path table, wherein the packets are simultaneously transmitted by scheduling a transmission order with reference to the path table in the packet transmission for spatial reusability of a channel, wherein the path table includes a set of paths to simultaneously transmit the packets from the gateway node to the plurality of receiver nodes for the spatial reusability of the channels, wherein the packets are consecutively transmitted from the gateway node to the plurality of receiver nodes by a back off procedure, and wherein a back off value of the back off procedure is selected based on a minimal contention window size and a maximal contention window size.

2. The packet transmission scheduling method of claim 1, wherein the predetermined distance is a 2-hop distance from the gateway node.

3. The packet transmission scheduling method of claim 2, wherein the gateway node performs scheduling on the packets according to an interleaving method.

4. A packet transmission method in a wireless network for simultaneously transmitting packets from a gateway node to a plurality of receiver nodes, comprising:

storing location information of the gateway node and the plurality of receiver nodes, and a path loss exponent of each multiplexing path in which one of the plurality of receiver nodes is located;

selecting from the plurality of receiver nodes two receiver nodes that are at a predetermined distance from the gateway node, calculating a Signal-to-Interference and Noise Ratio (SINR) for one of the selected receiver nodes, using a distance between the two selected receiver nodes and a corresponding path loss exponent, and when the calculated SINR exceeds a threshold, forming a path table that includes a path between the two selected receiver nodes to simultaneously transmit the packets from the gateway node to the two selected receiver nodes;

scheduling packet transmission based on the path table setting up a back off time and counting a back off time for a back off procedure when a channel is in an idle state for a predetermined time; and when the counting is completed, transmitting the packets based on a scheduling result, wherein the packets are simultaneously transmitted by scheduling a transmission order with reference to the path table in the packet transmission for spatial reusability of the channel, wherein the path table includes a set of paths to simultaneously transmit the packets from the gateway node to the plurality of receiver nodes for the spatial reusability of the channel, wherein the packets are consecutively transmitted from the gateway node to the plurality of receiver nodes by the back off procedure, and wherein a back off value of the back off procedure is selected based on a minimal contention window size and a maximal contention window size.

5. The packet transmission method of claim 4, wherein said transmitting the packets includes:

storing packets to be transmitted through each path of the path table in a queue in turn; and sequentially transmitting the packets stored in the queue in turn through the path.

6. The packet transmission method of claim 5, wherein the packets are transmitted through each path through back off time counting.

7. The packet transmission method of claim 4, wherein the predetermined distance is a 2-hop distance from the gateway node.

8. The packet transmission method of claim 7, wherein the gateway node performs scheduling on the packet according to an interleaving method.

9. The packet transmission method of claim 4, further comprising:

when a back off time of a next back off procedure is set up after completing the packet transmission, setting up the back off time of the next back off procedure longer than a back off time of a former back off procedure.

10. The packet transmission scheduling method of claim 1, wherein the calculation of the SINR for the one selected receiver node between the two selected receiver nodes also uses a distance between the one selected receiver node and a neighboring node of the one selected receiver node, and a distance between the one selected receiver node and a neighboring node of the other selected receiver node of the two selected receiver nodes.

11. The packet transmission method of claim 4, wherein the calculation of the SINR for the one selected receiver node between the two selected receiver nodes also uses a distance between the one selected receiver node and a neighboring node of the one selected receiver node, and a distance between the one selected receiver node and a neighboring node of the other selected receiver node of the two selected receiver nodes.

* * * * *